United States Patent Office 3,288,748
Patented Nov. 29, 1966

3,288,748
STABILIZATION OF OLEFIN POLYMERS WITH
N-HYDROCARBYL-ALKANOLAMINES
Henryk A. Cyba, Evanston, Ill., assignor to Universal Oil Products Company, Des Plaines, Ill., a corporation of Delaware
No Drawing. Filed June 27, 1963, Ser. No. 290,917
11 Claims. (Cl. 260—45.9)

This invention relates to the stabilization of olefin polymers and more particularly to the use of a novel inhibitor to prevent deterioration of the olefin polymer due to ultraviolet light.

One serious objection to the use of solid olefin polymers in the manufacture of articles to be exposed to sunlight is the deterioration of the polymer by ultraviolet light. Accordingly, many manufacturers have found it necessary to utilize only colored polyolefin for such use. Even the colored polyolefin undergoes deterioration due to ultraviolet light which results in its early stages in the breaking of the polymer chain and the formation of carbonyl groups. As deterioration continues, the polymer cracks and loses tensile strength to the point of mechanical failure. For example, electrical insulation prepared from solid olefin polymers will undergo embrittlement, increase of power factor and loss of electrical resistance when used in exposed locations. Such deterioration also apparently is accelerated by oxidation reactions. While many of the inhibitors heretofore proposed for use in polyolefin will inhibit such deterioration, the successful inhibitors impart discoloration to the polyolefin. It is apparent that there is a need for an inhibitor which will stabilize the polyolefin against the deterioration by ultraviolet light and at the same time will not impart undesired color to the polyolefin.

While the novel inhibitors of the present invention may be used in the stabilization of colored polyolefin articles, the inhibitors are advantageously used in clear or light colored polyolefin articles which are installed or placed outdoors or otherwise exposed to sunlight. Examples include light weight outdoor furniture, sheets used to protect construction from the effect of weather, insulation for electrical lines or other electrical equipment, etc.

The inhibitors of the present invention are particularly desirable for use in the stabilization of solid polyethylene. As will be shown by the data in the specific examples, these inhibitors are very effective in preventing deterioration of the polyethylene. However, these inhibitors also may be used for the stabilization of polypropylene, polybutylene, copolymers of ethylene and propylene, ethylene and butylene and propylene and butylene, which polymers appear to be more difficult to stabilize.

In one embodiment the present invention relates to a method of stabilizing olefin polymer against deterioration by ultraviolet light which comprises incorporating in said polymer a stabilizing concentration of an N-hydrocarbyl-alkanolamine inhibitor in which said hydrocarbyl contains at least four cabon atoms.

In another embodiment the present invention relates to solid olefin polymer containing an inhibitor as set forth herein.

As hereinbefore set forth, the inhibitor of the present invention is an N-hydrocarbyl-alkanolamine containing at least four carbon atoms in said hydrocarbyl. In a preferred embodiment the hydrocarbyl is selected from the group consisting of alkyl, alkenyl, aryl, alkaryl, aralkyl, cycloalkyl, alkylcycloalkyl and cycloalkylalkyl. Also, in a preferred embodiment the alkanol moiety contains from two to ten carbon atoms.

In one embodiment the inhibitor is an N-hydrocarbyl-alkanolamine containing one nitrogen and one hydroxyalkyl group. A preferred inhibitor in this embodiment is N-alkyl-alkanolamine in which the alkyl group contains at least four and preferably from about six and still more preferably from about eight to fifty or more carbon atoms and the alkanol moiety contains from two to eight carbon atoms. Preferred compounds in this embodiment include N-octyl-ethanolamine,
N-nonyl-ethanolamine,
N-decyl-ethanolamine,
N-undecyl-ethanolamine,
N-dodecyl-ethanolamine,
N-tridecyl-ethanolamine,
N-tetradecyl-ethanolamine,
N-pentadecyl-ethanolamine,
N-hexadecyl-ethanolamine,
N-heptadecyl-ethanolamine,
N-octadecyl-ethanolamine,
N-nonadecyl-ethanolamine,
N-eicosyl-ethanolamine, etc.

Other compounds in this embodiment include

N-butyl-ethanolamine,
N-pentyl-ethanolamine,
N-hexyl-ethanolamine and
N-heptyl-ethanolamine, as well as
N-alkyl-propanolamines in which the alkyl group contains from four to twenty carbon atoms and corresponding N-alkyl-butanolamines,
N-alkyl-pentanolamines,
N-alkyl-hexanolamines,
N-alkyl-heptanolamines,
N-alkyl-octanolamines,
N-alkyl-nonanolamines,
N-decanolamines, etc.

It is preferred that the alkyl substituent is of secondary configuration; that is, the alkyl group is attached to the nitrogen atom through an intermediate carbon atom of the alkyl group. Accordingly, the inhibitor preferably is an N-sec-alkyl-alkanolamine, the alkyl group containing from four to twenty carbon atoms. The secondary alkyl configuration is obtained readily by preparing the inhibitor by the reductive alkylation of the alkanolamine with a ketone.

In another embodiment the hydrocarbyl group is an alkenyl group and thus includes compounds as N-butenyl-ethanolamine,
N-pentenyl-ethanolamine,
N-hexenyl-ethanolamine,
N-heptenyl-ethanolamine,
N-octenyl-ethanolamine,
N-nonenyl-ethanolamine,
N-decenyl-ethanolamine,
N-undecenyl-ethanolamine,
N-dodecenyl-ethanolamine,
N-tridecenyl-ethanolamine,
N-tetradecenyl-ethanolamine,
N-pentadecenyl-ethanolamine,
N-hexadecenyl-ethanolamine,
N-heptadecenyl-ethanolamine,
N-octadecenyl-ethanolamine,
N-nonadecenyl-ethanolamine,
N-eicosenyl-ethanolamine, etc., as well as the correspondingly substituted alkanolamines containing from three to ten carbon atoms in the alkanol moiety.

In another preferred embodiment the hydrocarbyl group is a cycloalkyl group. Preferred compounds in this embodiment include N-cyclohexyl-ethanolamine,
N-cyclohexyl-propanolamine,
N-cyclohexyl-butanolamine,
N-cyclohexyl-pentanolamine,
N-cyclohexyl-hexanolamine,
N-cyclohexyl-heptanolamine,
N-cyclohexyl-octanolamine,
N-cyclohexyl-nonanolamine,
N-cyclohexyl-decanolamine, etc., corresponding compounds in which the cyclohexyl group is replaced by cyclopentyl, cycloheptyl, cyclooctyl, etc. Illustrative examples in which the hydrocarbyl group is an alkylcycloalkyl substituent include N-methylcyclohexyl-ethanolamine,
N-dimethylcyclohexyl-ethanolamine,
N-ethylcyclohexyl-ethanolamine,
N-diethylcyclohexyl-ethanolamine,
N-propylcyclohexyl-ethanolamine,
N-dipropylcyclohexyl-ethanolamine,
N-butylcyclohexyl-ethanolamine,
N-dibutylcyclohexyl-ethanolamine, etc.,
N-methylethylcyclohexyl-ethanolamine,
N-methylpropylcyclohexyl-ethanolamine,
N-ethylpropylcyclohexyl-ethanolamine,
N-methylbutylcyclohexyl-ethanolamine,
N-ethylbutylcyclohexyl-ethanolamine,
N-propylbutylcyclohexyl-ethanolamine, etc., and corresponding compounds in which the alkanol moiety contains from three to ten carbon atoms and/or in which the cycloalkyl group is selected from cyclopentyl, cycloheptyl, cyclooctyl, etc. Illustrative examples of compounds containing a cycloalkylalkyl group include N-cycohexylmethyl-ethanolamine,
N-cyclohexylethyl-ethanolamine,
N-cyclohexylpropyl-ethanolamine,
N-cyclohexylbutyl-ethanolamine,
N-cyclohexylpentyl-ethanolamine,
N-cyclohexylhexyl-ethanolamine,
N-cyclohexylheptyl-ethanolamine,
N-cyclohexyloctyl-ethanolamine, etc., as well as corresponding compounds in which the alkanol moiety contains from three to ten carbon atoms and/or compounds in which the cycloalkyl portion is selected from cyclopentyl, cycloheptyl, cyclooctyl, etc.

Illustrative examples of compounds in which the hydrocarbyl substituent includes an aryl group include N-phenyl-ethanolamine,
N-tolyl-ethanolamine,
N-xylyl-ethanolamine,
N-ethylphenyl-ethanolamine,
N-diethylphenyl-ethanolamine,
N-propylphenyl-ethanolamine,
N-dipropylphenyl-ethanolamine,
N-butylphenyl-ethanolamine,
N-dibutylphenyl-ethanolamine, etc.,
N-benzyl-ethanolamine,
N-phenylethyl-ethanolamine,
N-phenylpropyl-ethanolamine,
N-phenylbutyl-ethanolamine, etc., and corresponding compounds in which the alkanol moiety contains from three to ten carbon atoms.

In another preferred embodiment the N-hydrocarbyl-alkanolamine contains two hydrocarbyl groups. These compounds, in general, will correspond to the specific inhibitors hereinbefore set forth. In the interest of simplicity, only illustrative compounds in each class are set forth below. These illustrative inhibitors include N,N-dibutyl-ethanolamine, N,N-dipentyl-ethanolamine, N,N-dihexyl-ethanolamine, N,N-diheptyl-ethanolamine, N,N-dioctyl-ethanolamine, and similar compounds in which the alkyl groups each contains from nine to fifty carbon atoms, N,N-dibutenyl-ethanolamine and similar compounds in which the alkenyl groups each contains from five to fifty carbon atoms, N,N-dicyclohexyl-ethanolamine and similar compounds in which the cycloalkyl group is selected from cyclopentyl, cycloheptyl, cyclooctyl, etc., N,N-diphenyl-ethanolamine and similar compounds in which the phenyl nucleus contains alkyl substituents attached thereto, N,N-dibenzyl-ethanolamine and similar compounds in which the benzyl group is replaced by phenylethyl, phenylpropyl, phenylbutyl, etc. In all of the above compounds, it is understood that the ethanol moiety may be replaced by a hydroxyalkyl group containing from three to ten carbon atoms.

In another preferred embodiment the N-hydrocarbyl-alkanolamine contains one hydrocarbyl substituent and two hydroxyalkyl groups. The hydrocarbyl substituent is selected from those hereinbefore specifically set forth and the alkanol groups will contain from two to ten carbon atoms each. Illustrative examples in this embodiment include N-butyl-diethanolamine and corresponding compounds in which the butyl substituent is replaced by an alkyl group of from five to fifty carbon atoms, N-butenyl-diethanolamine and corresponding compounds in which the butenyl substituent is replaced by an alkenyl group containing from five to fifty carbon atoms, N-cyclohexyl-diethanolamine and corresponding compounds in which the cyclohexyl group contains alkyl substituent as well as corresponding compounds in which the cyclohexyl group is replaced by a cyclopentyl, cycloheptyl or cyclooctyl group, N-phenyl-diethanolamine and corresponding compounds in which the phenyl group is replaced by an alkylphenyl or phenylalkyl group, etc. It is understood that the diethanol moiety may be replaced by alkanol groups containing from three to ten carbon atoms each, as well as including compounds in which the alkanol groups are different but each containing from two to ten carbon atoms.

The compounds hereinbefore set forth comprise those containing one nitrogen. In another preferred embodiment of the invention, the inhibitor contains two or more nitrogen atoms. In a preferred embodiment the inhibitor is an N,N'-dihydrocarbyl-aminoethylethanolamine. Illustrative compounds in this embodiment include N,N'-dibutyl-aminoethylethanolamine,
N,N'-dipentyl-aminoethylethanolamine,
N,N'-dihexyl-aminoethylethanolamine,
N,N'-diheptyl-aminoethylethanolamine,
N,N'-dioctyl-aminoethylethanolamine,
N,N'-dinonyl-aminoethylethanolamine,
N,N'-didecyl-aminoethylethanolamine,
N,N'-diundecyl-aminoethylethanolamine,
N,N'-didodecyl-aminoethylethanolamine,
N,N'-ditridecyl-aminoethylethanolamine,
N,N'-ditetradecyl-aminoethylethanolamine,
N,N'-dipentadecyl-aminoethylethanolamine,
N,N'-dihexadecyl-aminoethylethanolamine,
N,N'-diheptadecyl-aminoethylethanolamine,
N,N'-dioctadecyl-aminoethylethanolamine,
N,N'-dinonadecyl-aminoethylethanolamine,
N,N'-dieicosyl-aminoethylethanolamine, etc.,
N,N'-dicyclohexyl-aminoethylethanolamine,
N,N'-dicyclopentyl-aminoethylethanolamine,
N,N'-dicycloheptyl-aminoethylethanolamine,
N,N'-dicyclooctyl-aminoethylethanolamine, etc.,
N,N'-diphenyl-aminoethylethanolamine,
N,N'-ditolyl-aminoethylethanolamine,
N,N'-dixylyl-aminoethylethanolamine,
N,N'-diethylphenyl-aminoethylethanolamine,
N,N'-dibenzyl-aminoethylethanolamine,
N,N'-diphenylethyl-aminoethylethanolamine, etc.

In another embodiment the inhibitor comprises N,N'-dihydrocarbyl-N-alkanol-aminoethylethanolamine and is illustrated by compounds as N,N'-dibutyl-N-hydroxyethyl-aminoethylethanolamine, corresponding compounds in which the butyl groups are replaced by alkyl groups containing from five to fifty carbon atoms each, corresponding compounds in which the alkyl groups are replaced by cycloalkyl or aryl-containing groups, corresponding compounds in which the hydroxyethyl group is replaced by a hydroxyalkyl group containing from three to ten carbon atoms.

Illustrative examples of compounds containing three nitrogen atoms include N,N-bis-[2-(hydrocarbylamino)-ethyl]-ethanolamine which also can be named $N^1,N^3$-dihydrocarbyl - $N^2$ - (2 - hydroxyethyl) - diethylenetriamine, N - [2 - (hydrocarbylamino) - ethyl] - N - [N - hydrocarbyl - N - (2 - hydroxyethyl) - 2 - aminoethyl] - ethanolamine which also can be named $N^1,N^3$-dihydrocarbyl-$N^1,N^2$ - di - (2 - hydroxyethyl) - diethylenetriamine, N-hydrocarbyl - N - [(N - hydrocarbyl - N - 2 - hydroxyethyl) - 2 - aminoethyl] - 2 - aminoethyl] - ethanolamine which also can be named $N^1,N^3$ - di - hydrocarbyl - $N^1,N^3$ - di - (2 - hydroxyethyl) - diethylenetriamine and N,N - bis-[N - hydrocarbyl - N - (2 - hydroxyethyl) - aminoethyl]-ethanolamine which also can be named $N^1,N^3$ - dihydrocarbyl - $N^1,N^2,N^3$ - tri - (2 - hydroxyethyl) - diethylenetriamine. It will be noted that the compounds specifically set forth above contain three nitrogen atoms and respectively 1,2,2 and 3-hydroxyalkyl groups. It is understood that the hydrocarbyl groups are selected from those hereinbefore specifically set forth and that the ethyl radical may be replaced by a hydrocarbon radical containing from three to ten carbon atoms, as well as that the hydroxyalkyl group may contain from two to ten carbon atoms. At least one of the hydroxyalkyl groupings provides the ethanolamine configuration essential to the inhibitors of the present invention.

In addition to serving to inhibit deterioration of the polyolefin without imparting undesired discoloration thereto, the additives of the present invention also serve as mold release agents, anti-blocking agents, dyeing aids, etc. These additional advantages are of importance in the manufacture and use of the polyolefin.

From the above description, it will be seen that the inhibitors of the present invention may be selected from a large variety of compounds, all of which contain an alkanolamine configuration and at least one hydrocarbyl substituent containing at least four carbon atoms attached to a nitrogen atom. While the inhibitors of the present invention are particularly effective in polyethylene, it is understood that the inhibitors are not necessarily equivalent in their effectiveness in this or other polyolefins.

The inhibitors of the present invention are prepared in any suitable manner. In one method, they are prepared by the reductive alkylation of an alkanolamine with a ketone of at least four carbon atoms and preferably from eight to fifty or more carbon atoms in order to form an N-hydrocarbyl-alkanolamine in which the hydrocarbyl group is of secondary configuration. In another method the inhibitors are prepared by the oxyalkylation of an N,N'-di-sec-alkyl-alkylenepolyamine, for example, with alkylene oxide including particularly ethylene oxide and propylene oxide. These methods of preparation are now known in the art and, because they do not constitute a novel feature of the present invention, the details thereof are not repeated here in the interest of simplicity. However, typical methods of preparation are described in the appended examples which illustrate the preparation of specific compounds.

The inhibitor of the present invention is incorporated in the polyolefin in a stabilizing concentration which may range from about 0.05% to about 10% by weight and preferably from about 0.5% to about 2% by weight of the polymer. The inhibitor is incorporated in the polyolefin in any suitable manner and at any suitable stage of preparation. Because the inhibitor may effect polymerization of the olefin, it generally is preferred to incorporate the inhibitor after the polyolefin is prepared. In one method the polyolefin is recovered as powder, pellets, cylinders, spheres, sheets, rolls, bars, etc., and these may be commingled with the inhibitor in any suitable manner, such as by partly melting the polyolefin and adding the inhibitor to the hot melt with stirring, either in a Banbury mixer, an extruder or in any other suitable manner. In another method, incorporation of the inhibitor is effected on a steam heated two-roll mill of conventional commercial design. The polyolefin containing the inhibitor is recovered in sheet form and may be fabricated in any desired manner. When fibers are desired, the inhibited polyolefin is recovered from the Banbury mixer and is extruded through a spinnerette.

The inhibitor is utilized as such or is prepared as a solution in a suitable solvent including alcohols and particularly methanol, ethanol, propanol, butanol, etc., hydrocarbons and particularly benzene, toluene, xylene, cumene, etc. However, the solvent must not be detrimental to the polyolefin and, therefore, a preferred solvent comprises the same solvent used during the manufacture or working of the polyolefin. It is understood that the inhibitor also may be used along with other additives incorporated in polyolefins for various purposes. While the inhibitor of the present invention is particularly useful in clear polyolefins, it also may be used in colored polyolefins and, in such cases, the inhibitor may be used along with carbon black which generally is employed in a concentration of below about 5% by weight and generally from about 1% to about 3% by weight. Similarly, pigments, zinc oxide, titanium oxide, etc., may be incorporated in the polyolefin, the oxides usually being employed in a concentration of from about 2% to about 10% by weight. In some cases, silicates, dyes and/or fillers also are incorporated in the polyolefin.

It is understood that the inhibitor of the present invention also may be used along with other inhibitors or other ultraviolet light stabilizers. The other inhibitors generally will be of the phenolic or amine type and and may include phenyl-alpha-naphthylamine, phenyl-beta-naphthylamine, phenothiazine, dialkylated phenols, trialkylated phenols including 2,6 - di - tertiary-butyl-4-methylphenol, 2,4 - dimethyl-6-tertiarybutylphenol, etc., alkyl-alkoxyphenols, diphenyl-p-phenylenediamine, 1,1,3-tris - (2-methyl - 4 - hydroxy-5-t-butylphenyl)-butane, p-octylphenylsalicylate, various phosgene alkylated phenol reaction products, various alkoxyalkyldihydroxybenzophenones, polyalkyldihydroxybenzophenones, tetrahydroxybenzophenones, 2,4,5 - trihydroxybutyrophenone, etc. Other ultraviolet light stabilizers include nickel-bis-dithiocarbamates, nickel - bis - dihydroxypolyalkylphenol sulfides, dilauryl beta-mercaptodipropionate, dihydroxytetraalkyl sulfides, dihydroxytetraalkyl methanes, various trithiophosphites as trilaurylthiophosphite, dialkylphosphites, trialkylphosphites, high molecular weight nitriles, various Mannich bases, etc.

The following examples are introduced to illustrate further the novelty and utility of the present invention but not with the intention of unduly limiting the same.

EXAMPLE I

The inhibitors of this and the following examples were evaluated by outdoor exposure in the following manner. The polyolefin used in these evaluations was a special batch of commercial polyethylene. This special batch of polyethylene was obtained free of inhibitors in order that it may be used as a proper control sample to evaluate the effect of different inhibitors. The solid polyethylene is of the high density type. The polyethylene was milled in a two-roll heated mill of conventional commercial design and the inhibitor was incorporated in the sample during the milling. The samples were pressed into sheets of about 17 mil thickness and cut into plaques of about 1⅜" x 1½". The plaques were exposed to weathering on an outdoor rack facing south and inclined at a 45° angle at Des Plaines, Illinois. The samples were analyzed periodically by infrared analysis and the intensity of the carbonyl band at 1715 cm.$^{-1}$ was determined and reported as "carbonyl number." The higher intensity of the carbonyl band indicates a higher carbonyl concentration (expressed as carbonyl number) and accordingly increased deterioration.

Deterioration of the polyolefin exposed outdoors increases rapidly during the late spring, summer and early fall months. A sample of the polyethylene without inhibitor, when exposed outdoors in about the middle of May, underwent an increase in carbonyl number of above 720 by the end of August. Another sample of the same polyethylene without the inhibitor, when placed outdoors in the beginning of January, increased in carbonyl number from an initial of about 25 to about 90 by the beginning of May and then shot up to over 500 by the middle of July.

The inhibitor used in this example is N-sec-heptadecyl-ethanolamine and was prepared by the reductive alkylation of ethanolamine with methyl pentadecyl ketone. The preparation was made by reacting 122 g. (2-moles) of ethanolamine with 508 g. (2 moles) of methyl pentadecyl ketone at 120°–140° C. in the presence of 125 atmospheres of hydrogen and 100 g. of alumina-platinum catalyst. The reaction mixture was filtered to separate the catalyst and to recover the product.

One percent by weight of the N-heptadecyl-ethanolamine, prepared in the above manner, was incorporated into another sample of the polyethylene described above. This sample was exposed outdoors in the same manner as also described above and, by the middle of May, there was no increase in carbonyl number. The carbonyl number increased from about an initial of 90 to only 146 by the end of September. This sample eventually was exposed outdoors for a total of 514 days and the carbonyl number increased to only 149 after this lengthy exposure. Of importance is the fact that the polyethylene remained white during milling of the inhibitor therein and all through the outdoor exposure.

From the data in the above table, it will be seen that the inhibitor was very effective in retarding deterioration of the polyethylene and did not cause discoloration thereof.

EXAMPLE II

The inhibitor of this example is N-sec-nonadecyl ethanolamine and was prepared by reductively alkylating 122 g. (2 moles) of monoethanolamine with 564 g. (2 moles) of methyl-heptadecyl ketone in the presence of 100 g. of benzene, 100 atmospheres of hydrogen and 100 g. of alumina-platinum catalyst at 160° C.

One percent by weight of the N-nonadecyl-ethanolamine, prepared in the above manner, was incorporated in another sample of the polyethylene described in Example I and, when exposed outdoors in the same manner as described in Example I, the carbonyl number increased from an original of 70 to only 89 after 238 days. The sample was placed outdoors in the middle of August and by November 9 the carbonyl number had increased to only 73. Here again, the increase in carbonyl number is only 29 and the evaluation accordingly is being continued. In addition to effectively inhibiting deterioration of the polyethylene, it is important to note that the polyethylene remained white during the milling and throughout the outdoor exposure.

EXAMPLE III

The inhibitor of this example is N-sec-heptadecyl-aminoethylethanolamine (also can be named N-sec-heptacyl-N'-hydroxyethyl-ethylenediamine) and was prepared by the reductive alkylation of 218 g. (2 moles) of aminoethylethanolamine with 508 g. (2 moles) of methyl pentadecyl ketone in the presence of hydrogen and 100 g. of alumina-platinum catalyst. Following completion of the reaction, the reaction mixture was filtered to remove catalyst and the product was recovered as a yellow viscous liquid having a boiling point of 201–3° C. at 0.3 mm.

One percent by weight of the N-heptadecyl-aminoethyl-ethanolamine, prepared as described above, was incorporated in another sample of the polyethylene described in Example I and exposed outdoors in the same manner as therein described. The sample was placed outdoors at the end of November and after 473 days of outdoor exposure, the carbonyl number increased from an original of 104 to a final of 267. It will be noted that the sample was exposed outdoors for about one and one-half years. The sample remained white all throughout the outdoor exposure and thus again demonstrates the effectiveness of the additive in inhibiting deterioration of the polyethylene without imparting undesired discoloration thereto.

EXAMPLE IV

The inhibitor of this example is N-sec-nonadecyl-aminoethylethanolamine (also can be named N-sec-nonadecyl-N'-hydroxyethyl-ethylenediamine) and was prepared by the reductive alkylation of 109 g. (1 mole) of aminoethylethanolamine with 282 g. (1 mole) of methyl heptadecyl ketone at 120° C. in the presence of xylene solvent, 125 atmospheres of hydrogen and alumina-platinum catalyst. Twenty-two cc. of water was collected and, following completion of the reaction, the reaction mixture was filtered to remove the catalyst and to recover the product as a liquid having a boiling point of 212°–214° C. at 0.35 mm. The basic molecular weight is 187.5 which corresponds to the theoretical molecular weight of 185.

One percent by weight of N-nonadecyl-aminoethyl-ethanolamine, prepared as described above, was incorporated in another sample of the polyethylene described in Example I and exposed outdoors in the same manner as described therein. The sample was placed outdoors at the end of November and after 514 days (about one and one-half years) the carbonyl number increased from an initial of 65 to only 225. Here again, the sample was white throughout the full exposure. This again demonstrates the effectiveness of the additive to inhibit deterioration of the polyethylene without imparting undesired discoloration thereto.

EXAMPLE V

The inhibitor of this example is N,N-bis-[N-sec-pentatriacontyl - N - (2 - hydroxyethyl) - aminoethyl] - ethanolamine. This compound also may be named $N^1,N^3$-di-sec-pentatriacontyl - $N^1,N^2,N^3$ - tri - (2-hydroxyethyl)-diethylenetriamine. It was prepared by first reductively alkylating one mole proportion of diethylenetriamine with two mole proportions of pentatriacontanone to prepare $N^1,N^3$-di-pentatriacontyl-diethylenetriamine. 108 g. (0.1 mole) of $N^1,N^3$ - di-pentatriacontyl-diethylenetriamine then were reacted with 25 g. (0.4 mole) of ethylene oxide at 120° C. for seven and one-half hours. N,N-bis-[N-pentatriacontyl - N - (2 - hydroxyethyl) - aminoethyl]-ethanolamine was recovered as a solid having an equivalent weight of 463 which corresponds to the theoretical equivalent weight of 405.

One percent by weight of N,N-bis-[N-sec-pentatriacontyl - N - (2 - hydroxyethyl) - aminoethyl] - ethanolamine, prepared as described above, was incorporated in another sample of the polyethylene described in Example I and exposed outdoors in the same manner as described therein. The sample was placed outdoors at the end of November and after 514 days (about one and one-half years) the carbonyl number increased from an initial of 91 to only 241. Here again, the sample was white throughout the full exposure. This is another demonstration of the effectiveness of the additive to inhibit deterioration of the polyethylene without imparting undesired discoloration thereto.

EXAMPLE VI

The inhibitor of this example is N,N'-di-sec-nonadecyl-2-hydroxy-1,3-diaminopropane. It will be noted that this compound contains the ethanolamine configuration and the hydrocarbyl substituent essential to the inhibitors of the present invention. This compound was prepared by reductively alkylating 22 g. (0.25 mole) of 1,3-diamino-2-propanol with 141 g. of methyl heptadecyl ketone in 100 g. of toluene at 160° C., 100 atmospheres of hydrogen and 50 g. of alumina-platinum catalyst. 8.5 cc. of water was collected. The reaction mixture was filtered to remove the catalyst and the solvent was removed by vacuum distillation.

N,N' - di - sec - nonadecyl - 2 - hydroxy - 1,3 - diaminopropane, in a concentration of one percent by weight, was incorporated in another sample of the polyethylene described in Example I and exposed outdoors in the same manner as therein described. The sample was placed outdoors at the end of November and after 514 days (about one and one-half years) the carbonyl number increased from an initial of 106 to only 223. Here again, the sample remained white throughout the full exposure.

EXAMPLE VII

As hereinbefore set forth, the inhibitors of the present invention may be used along with additional additives. In this example, one percent by weight of N-sec-octyl-diethanolamine was used in admixture with 0.075% by weight of butylated hydroxytoluene (2,6-dibutyl-4-methylphenol).

The N-sec-octyl-diethanolamine was prepared by reacting 180 g. (2 moles) of diethanolamine with 770 g. (6 moles) of methyl hexyl ketone in the presence of 100 g. of alumina-platinum catalyst at a temperature of about 180° C. and 100 atmospheres of hydrogen for twelve hours. Following completion of the reaction, the reaction vessel was cooled, the reaction mixture filtered to remove catalyst, and the product distilled to separate the N-sec-octyl-diethanolamine.

When used alone, the butylated hydroxytoluene was of substantially no effect in retarding deterioration of the polyethylene. However, it is compatible with the inhibitors of the present invention and appears to produce improved effects. When a mixture of one percent by weight of N-sec-octyl-diethanolamine and 0.075% by weight of butylated hydroxytoluene was incorporated into another sample of the polyethylene described in Example I and exposed outdoors in the same manner described therein, the carbonyl number increased from an initial of 20 to only 54 from the end of April to the end of August and to a total of only 72 after 352 days of outdoor exposure. The polyethylene remained white throughout the full exposure. It will be noted that the carbonyl number had not increased 100 numbers during about one year's exposure outdoors and accordingly the evaluation is being continued.

EXAMPLE VIII

The inhibitor of this example is N,N'-di-sec-octyl-N-hydroxyethyl-aminoethylethanolamine [also can be named N,N'-di-sec-octyl-N,N'-di-(2-hydroxyethyl)ethylenediamine] and was prepared by reacting N,N'-bis-(1-methyl-heptyl)ethylenediamine with two mole proportions of ethyleneoxide. The reaction was effected in a turbomixer at a temperature of about 115° C. for about two hours at a pressure of about 250 p.s.i.

One percent by weight of N,N'-di-sec-octyl-N-hydroxyethyl-aminoethylethanolamine, prepared in the above manner, and 0.075% by weight of butylated hydroxytoluene were incorporated in another sample of the polyethylene described in Example I. When evaluated in the same manner as described in Example I (the sample being placed outdoors at the end of April), the carbonyl number increased from an initial of 20 to only about 48 by the middle of August and only to 71 after 352 days. Here again, the polyethylene was white in color. This further demonstrates the effectiveness of the inhibitor in retarding deterioration of the polyethylene during the critical late spring, summer and fall months and also demonstrates the non-discoloring quality of the inhibitor.

EXAMPLE IX

The inhibitor of this example is N,N-bis-[N-sec-octyl-N-(2-hydroxyethyl)aminoethyl]-ethanolamine, which also may be named $N^1,N^3$-di-sec-octyl-$N^1,N^2,N^3$-tri-(2-hydroxyethyl)-diethylenetriamine. The inhibitor was prepared by reacting one mole proportion of $N^1,N^3$-bis-(1-ethyl-3-methylpentyl)-diethylenetriamine with three mole proportions of ethylene oxide in a turbomixer at a temperature of about 100° C. for four hours.

One percent by weight of the N,N-bis-[N-sec-octyl-N-(2-hydroxyethyl)aminoethyl]-ethanolamine, prepared in the above manner, and 0.075% by weight of butylated hydroxytoluene were incorporated in another sample of the polyethylene described in Example I. The polyethylene was evaluated by outdoor exposure in the same manner as heretofore described. The sample was placed outdoors at the end of April and the carbonyl number increased from an initial of 32 to only 95 by the middle of September and to only 112 after 352 days (almost a year) of outdoor exposure. Here again, the polyethylene was white throughout the exposure. This again demonstrates the non-discoloring quality of the inhibitor and also its effectiveness in retarding deterioration of the polyethylene during the critical spring, summer and fall months.

EXAMPLE X

The inhibitor of this example is N-dicyclohexylethanolamine and was prepared by the reductive alkylation of ethanolamine with cyclohexanone. The reaction was effected using 155 g. (2.5 moles) of ethanolamine and 600 g. (6 moles) of cyclohexanone in the presence of hydrogen and 100 g. of alumina-platinum catalyst at 160° C. Following completion of the reaction, the catalyst was removed by filtering and the inhibitor was recovered by distillation.

One percent by weight of N-dicyclohexyl-ethanolamine and 0.075% butylated hydroxytoluene were incorporated into another sample of the polyethylene described in Example I. The inhibited polyethylene was evaluated by outdoor exposure in the same manner as described in Example I. The sample was placed outdoors in the latter part of April and the original carbonyl number of 29 increased to only 85 by the middle of October and to only 110 after about one year of outdoor exposure. The sample of polyethylene remained white throughout the complete evaluation. This further demonstrates the effectiveness of the inhibitor of the present invention, both in retarding deterioration of the polyethylene and also in maintaining the original color thereof.

EXAMPLE XI

The inhibitor of this example in N,N'-dicyclohexyl-aminoethylethanolamine and was prepared by the reductive alkylation of 210 g. (2 moles) of aminoethylethanolamine with 400 g. (4 moles) of cyclohexanone at 100° C. in the presence of hydrogen and 100 g. of alumina-platinum catalyst. Following completion of the reaction, the catalyst was removed by filtering and the inhibitor was recovered by distillation.

One percent by weight of N,N'-dicyclohexyl-aminoethylethanolamine, prepared in the above manner, and 0.075% of butylated hydroxytoluene were incorporated in another sample of the polyethylene heretofore described and evaluated in the same manner as described in Example I. The sample was placed outdoors in the middle of May. This sample had an original carbonyl number of 74, which number increased to only 135 by the middle of September and to only 165 after 334 days of outdoor exposure. Here again, the sample was white throughout the complete evaluation.

EXAMPLE XII

The inhibitor of this example is N,N'-di-sec-butyl-aminoethylethanolamine and was prepared by the reaction of two moles of aminoethylethanolamine with four moles plus an excess of methyl ethyl ketone at 100° C. in the presence of hydrogen and 100 g. of alumina-platinum catalyst. Following completion of the reaction, the catalyst was removed by filtering and the inhibitor was recovered by distillation.

One percent by weight of N,N'-di-sec-butyl-aminoethylethanolamine, prepared in the above manner, and 0.075% by weight of butylated hydroxytoluene were incorporated in another sample of the polyethylene heretofore described and evaluated in outdoor exposure in the same manner as described in Example I. This sample was placed outdoors in February and the original carbonyl number of 26 increased to only 62 by the middle of August and to only 88 after 352 days of outdoor exposure. Here again, the sample was white throughout the evaluation.

EXAMPLE XIII

This example reports results of evaluations made in a low density polyethylene commercially available from the Visking Corporation. These evaluations were made in the same manner as described in Example I.

The inhibitor of this example is N-sec-nonadecylethanolamine, prepared as described in Example II.

A sample of this polyethylene without the inhibitor of the present invention was placed outdoors in the middle of May and by the end of June the original carbonyl number of 34 increased to 255. By the end of August the carbonyl number had increased to 873 and to over 1000 before the end of September. In contrast, another sample of this polyethylene containing 1% by weight of N-sec-nonadecylethanolamine which was placed outdoors in the middle of August increased in carbonyl number from an original of 56 to only 195 after 238 days of outdoor exposure. Here again, the sample was clear throughout the complete evaluation.

EXAMPLE XIV

Another evaluation was made using the polyethylene described in Example XIII, 1% by weight of N-sec-nonadecylethanolamine described in Examples II and XIII and 0.15% by weight of butylated hydroxytoluene.

The sample of polyethylene containing these additives was placed outdoors in the middle of August and increased in carbonyl number to only 163 after 238 days of outdoor exposure. Here again, the sample remained white throughout the complete exposure.

EXAMPLE XV

The inhibitor of the present invention also was evaluated in a special batch of commercial solid polypropylene. This special batch of solid polypropylene was obtained free of inhibitors in order that it may be used as a proper control sample to evaluate the effect of different inhibitors.

The solid polypropylene used in this example is stated to have the following properties:

Table I

| | |
|---|---|
| Specific gravity | 0.910–0.920 |
| Refractive index, $n_D^{25}$ | 1.510 |
| Heat distortion temperature | |
| At 66 p.s.i. load _____° F__ | 240 |
| At 264 p.s.i. load _____° F__ | 150 |
| Tensile yield strength, p.s.i. (ASTM D638–58T) (0.2″ per min.) | 4700 |
| Total elongation, percent | 300–400 |
| Stiffness, flexural (ASTM D747–50) $10^5$ p.s.i. | 1.8 |
| Shore hardness (ASTM D676–55T) | 74D |

A sample of the polypropylene without inhibitors was placed outdoors about the middle of May and by the end of the month had increased from an initial carbonyl number of 144 to a carbonyl number of 764. It is apparent that this polypropylene was undergoing rapid deterioration. In contrast, another sample of the polypropylene containing 1% by weight of N,N'-dicyclohexyl-aminoethylethanolamine, prepared as described in Example XI, and 0.5% by weight of butylated hydroxytoluene were placed outdoors in February and the carbonyl number had increased from an original of 200 to 450 after 112 days of outdoor exposure. The sample was clear throughout the complete evaluation.

EXAMPLE XVI

This example reports results in a different commercial solid polypropylene which is believed to be similar to the polypropylene described in Example XV. A sample of this polypropylene without the inhibitor of the present invention increased from an initial carbonyl number of 122 to 716 after 13 days of outdoor exposure. Here again, it is seen that the polypropylene was undergoing rapid deterioration.

In contrast to the above, another sample of this polypropylene containing 1% by weight of N-nonadecylethanolamine, prepared as described in Example II, was placed outdoors in the early part of June and had increased from an initial carbonyl number of 150 to a carbonyl number of only 223 after 28 days of outdoor exposure during this critical period.

EXAMPLE XVII

As hereinbefore set forth, butylated hydroxytoluene by itself is not an effective additive to inhibit deterioration of the polyolefin. Another sample of the polypropylene described in Example XVI was prepared to contain 0.15% by weight of butylated hydroxytoluene as the only additive. This sample was placed outdoors in July and after 28 days had increased from an initial carbonyl number of 176 to over 1000. It will be noted that this is slightly better than the sample of the polypropylene without any additive, but is not at all comparable with the inhibitor of the present invention as described in Example XVI.

EXAMPLE XVIII

Evaluations of the polyethylene described in Example I also were made in a Weather-Ometer. The Weather-Ometer was operated without the use of water sprays. The samples of polyethylene were prepared in substantially the same manner as described in Example I and the plaques were inserted into plastic holders, affixed onto a rotating drum and exposed to carbon arc rays at about 52° C. in the Weather-Ometer. Here again, the samples were examined periodically by infrared analysis to determine the carbonyl band at 1715 cm.$^{-1}$.

A sample of the polyethylene without inhibitor, when evaluated in the Weather-Ometer, increased from a carbonyl number of 28 to 855 within 624 hours. In contrast, another sample of the polyethylene containing 1% by weight of N,N'-di-sec-octyl-N-hydroxyethylene-aminoethylethanolamine, prepared as described in Example VIII, and 0.075% by weight of butylated hydroxy toluene developed a carbonyl number of only 250 after 1392 hours. Here again, the sample remained white throughout the complete evaluation.

EXAMPLE XIX

Evaluations in the Weather-Ometer also were made using another sample of the polyethylene described in Example I containing 1% by weight of N,N-bis-[N-sec-octyl-N-(2-hydroxyethyl)aminoethyl]ethanolamine, prepared as described in Example IX, and 0.075% by weight of butylated hydroxy toluene.

When evaluated in the Weather-Ometer in the same manner as described in Example XVIII, the polyethylene increased from an initial carbonyl number of 32 to only 254 after 1392 hours. The sample remained white throughout the complete evaluation. Here again, the effectiveness of the inhibitor of the present invention is demonstrated.

EXAMPLE XX

Evaluations in the Weather-Ometer also were made using a sample of the polypropylene described in Example XVI. A sample of this polypropylene without inhibitor increased from an initial carbonyl number of 125 to over 1000 in 144 hours exposure in the Weather-Ometer.

In contrast to the above, a sample of the polypropylene containing 1% by weight of N,N-di-octyl-ethanolamine increased to 326 after 264 hours of exposure. Another sample of the polypropylene containing 1% by weight of N,N-di-octyl-ethanolamine and 0.5% by weight of butylated hydroxy toluene increased to a carbonyl number of only 205 after 384 hours of exposure in the Weather-Ometer.

I claim as my invention:

1. Olefin polymer normally subject to deterioration due to ultraviolet light containing, as an inhibitor against said deterioration, a stabilizing concentration of an N-hydrocarbyl-alkanolamine inhibitor in which said hydrocarbyl contains at least four carbon atoms.

2. Olefin polymer normally subject to deterioration due to ultraviolet light containing, as an inhibitor against said deterioration, a stabilizing concentration of an N-alkyl-alkanolamine inhibitor in which said alkyl contains from six to fifty carbon atoms.

3. Solid polyethylene normally subject to deterioration due to ultraviolet light containing, as an inhibitor against said deterioration, a stabilizing concentration of N-sec-nonadecyl-ethanolamine.

4. Olefin polymer normally subject to deterioration due to ultraviolet light containing, as an inhibitor against said deterioration, a stabilizing concentration of N,N-di-hydrocarbyl-alkanolamine inhibitor in which each of said hydrocarbyls contains at least four carbon atoms.

5. Solid polyethylene normally subject to deterioration due to ultraviolet light containing, as an inhibitor against said deterioration, a stabilizing concentration of N,N-di-sec-octyl-ethanolamine.

6. Solid polyethylene normally subject to deterioration due to ultraviolet light containing, as an inhibitor against said deterioration, a stabilizing concentration of N,N-dicyclohexyl-ethanolamine.

7. Olefin polymer normally subject to deterioration due to ultraviolet light containing, as an inhibitor against said deterioration, a stabilizing concentration of an N-hydrocarbyl-dialkanolamine in which said hydrocarbyl contains at least four carbon atoms.

8. Solid polyethylene normally subject to deterioration due to ultraviolet light containing, as an inhibitor against said deterioration, a stabilizing concentration of N-sec-octyl-diethanolamine.

9. Olefin polymer normally subject to deterioration due to ultraviolet light containing, as an inhibitor against said deterioration, a stabilizing concentration of N,N'-di-hydrocarbyl-aminoalkylalkanolamine in which each of said hydrocarbyls contain at least four carbon atoms.

10. Olefin polymer normally subject to deterioration due to ultraviolet light containing, as an inhibitor against said deterioration, a stabilizing concentration of N,N-di-alkyl-N-hydroxyalkyl-aminoalkylalkanolamine in which said dialkyl each contains at least four carbon atoms.

11. Solid polyethylene normally subject to deterioration due to ultraviolet light containing, as an inhibitor against said deterioration, a stabilizing concentration of N,N'-di-sec-octyl - N-hydroxyethyl - aminoethylethanolamine.

References Cited by the Examiner
FOREIGN PATENTS
1,025,139   2/1958   Germany.

LEON J. BERCOVITZ, *Primary Examiner.*

M. J. WELSH, *Assistant Examiner.*